United States Patent
Allmendinger

(10) Patent No.: US 10,342,384 B2
(45) Date of Patent: Jul. 9, 2019

(54) PELLET BARBECUE WITH EXHAUST GAS RECIRCULATION

(71) Applicant: Klaus Karl Allmendinger, San Juan Capistrano, CA (US)

(72) Inventor: Klaus Karl Allmendinger, San Juan Capistrano, CA (US)

(*) Notice: Subject to any disclaimer, the term of this patent is extended or adjusted under 35 U.S.C. 154(b) by 174 days.

(21) Appl. No.: 15/642,288

(22) Filed: Jul. 5, 2017

(65) Prior Publication Data

US 2019/0008321 A1 Jan. 10, 2019

(51) Int. Cl.
*A47J 37/07* (2006.01)
*F24B 1/20* (2006.01)
*F24B 7/00* (2006.01)
*F24B 13/04* (2006.01)

(52) U.S. Cl.
CPC ....... *A47J 37/0754* (2013.01); *A47J 37/0722* (2013.01); *F24B 1/20* (2013.01); *F24B 7/002* (2013.01); *F24B 7/005* (2013.01); *F24B 13/04* (2013.01)

(58) Field of Classification Search
CPC ..... A47J 37/0754; A47J 37/0722; F24B 1/20; F24B 7/002; F24B 7/005; F24B 13/04
See application file for complete search history.

(56) References Cited

U.S. PATENT DOCUMENTS

| | | | | |
|---|---|---|---|---|
| 3,933,145 A | * | 1/1976 | Reich | A47J 37/0754 126/25 R |
| 4,823,684 A | * | 4/1989 | Traeger | A47J 37/0704 126/10 |
| 5,582,117 A | * | 12/1996 | Mendive | F23B 1/30 110/165 R |
| 2015/0320259 A1 | * | 11/2015 | Tucker | A47J 37/0704 126/25 R |

FOREIGN PATENT DOCUMENTS

RU 2126932 * 2/1999

* cited by examiner

*Primary Examiner* — Alfred Basichas
(74) *Attorney, Agent, or Firm* — Denis Khoo

(57) ABSTRACT

A pellet barbecue configured to recirculate exhaust gas, allowing for the reduction of oxygen in the cooking chamber. The pellet barbecue is configured with an exhaust gas recirculation system, and an angled bottom fire pot. The electric gas recirculation fan pulls gases from a gas recirculation channel, and blows it onto the angled bottom fire pot. The gas recirculation channel is equipped with a movable mixer flap to control how much of the gas pulled by the gas recirculation fan is exhaust gas or outside air. The pellet barbecue controller monitors the conditions in the cooking chamber, and controls the gas recirculation fan speed and positioning of the mixer flap to maintain a desired temperature, while optimizing the concentration of wood taste compounds from the pellets in the cooking chamber.

14 Claims, 6 Drawing Sheets

FIG. 1 – Prior Art

PELLET BARBECUE WITH EXHAUST GAS RECIRCULATION

BACKGROUND OF THE INVENTION

Field of the Invention

This invention relates generally to a pellet burning barbecue, and more particularly to a pellet burning barbecue with recirculation.

Description of the Related Art

Pellet barbecues aka pellet grills or pellet smokers were invented in 1985 by Joe Traeger and patented in 1987 (U.S. Pat. No. 4,823,684). In a pellet barbecue (see schematic cross section FIG. 1) wood pellets, comprised of highly compressed hardwood sawdust, are transported from a pellet hopper 1 by a motorized auger 2 to a flat bottomed cylindrical fire pot 3, disposed in a cooking chamber 4. Air is forced by an electric combustion fan 5 through an air channel 6 to the fire pot 3 where the air enters the fire pot through holes in its cylindrical walls.

The pellets in the fire pot are ignited by an electrically heated igniter 9, or, if pellets are already burning in the fire pot, by the burning pellets in the fire pot.

The resulting combustion gases are deflected by one or more heat deflector plates or baffles 7 to flow evenly through the cooking chamber 4.

The combustion fan 5 of a typical pellet barbecue is typically rated to a free-air flow rate of 50-100 cfm (cubic feet per minute). With the restrictions imposed by the air-channel 6 and holes in the fire pot 3, this reduces to an estimated 30-50 cfm, or 51-85 m3/hour.

Finally, the resulting combustion gases and excess air is exhausted through the exhaust port 8.

The air flow induced by the combustion fan 5 performs four main functions:

a) Supply oxygen for pellet combustion.

b) Produce the required gas flow for circulation of the gases through the cooking chamber 4.

c) Blow the solid combustion residuals (ash) out of the fire pot 3, which are then deposited in the bottom of the cooking chamber 4.

d) Cool the cooking chamber temperature to the desired barbecue temperature by diluting the hot combustion gases with air at ambient temperature.

The temperature of the gases in the cooking chamber is typically controlled by varying the feed rate of pellets into the fire pot by the electronic, typically computerized, pellet barbecue controller 10, by switching the auger motor periodically on and off. For example, 15 seconds on, followed by 65 seconds off. The resulting auger duty cycle would be Ton/(Ton+Toff), where Ton is the on-time of the auger in a cycle and (Ton+Toff) is the sum of on-time and off-time, the total cycle time. In the example, the duty cycle would be 0.1875, which means the average pellet feed rate is 18.75% of the feed rate the auger is capable of when always on.

Early pellet barbecue controllers operated with fixed, user-selectable pellet auger duty cycles. For example, Low, Medium and High, where High was equivalent to always on or 100% duty cycle.

Current pellet barbecues incorporate one or more temperature sensors 11, disposed in the cooking chamber and connected to the pellet barbecue controller 10, to continuously vary the pellet duty cycle to regulate the temperature to the user-selected temperature.

Some pellet barbecue manufacturers today also control the air-flow rate of the combustion fan to lower the pellet burn rate when low temperatures are required.

Barbecuing is the exposure of food, typically meat or meat products, to relatively low temperature exhaust gases (typically 90-120° C.) produced by glowing wood or charcoal for relatively long periods of time, in the order of hours. In contrast to baking or roasting in an electrically or gas heated oven, the food items acquire thereby the typical desired wood smoke smell and taste.

Pellet barbecues promise, compared to traditional charcoal or wood fired barbecues, the convenience of simple operation by just setting a temperature and automatic monitoring of the temperature and fuel feed. At the same time pellet barbecues promise to deliver the wood smoke smell and taste generated by burning wood or charcoal.

However, they fall short of the second goal for several reasons.

The air flow rate of the combustion fan, even when reduced to the lowest flow rate typical fan motors are capable of, causes the pellets to burn at relatively high temperature (est. 1000-1200° C.). Research has shown (see FIG. 2) that the wood smoke taste and smell is caused mainly by the phenolic compounds guaiacol and syringol, which are released when wood coals glow at ideally 600-700° C. At the high temperatures the pellets are burning, these phenolic compounds are also partially thermally decomposed in the actively burning gases released by the burning wood.

The pellet feed rate of a typical mid-sized pellet barbecue at barbecuing temperatures is 0.165 to 0.22 kg/hr (15-18% of a typical auger maximum feed rate of 1.1 kg of pellets per hour). The air-fuel ratio for complete (stoichiometric) combustion of wood by mass is around 6.1 according to the relevant literature, meaning 6.1 kg of air are required to burn 1 kg of wood. Therefore, the air-flow required to burn the pellets would be 0.915-1.342 kg/hr of air, equivalent to 0.69-1.11 m3/hr at sea level conditions at 25 degrees C. ambient air temperature.

However, the flow rate of the combustion fan for a typical pellet barbecue, as stated earlier is 51-85 m3/hour, equivalent to 60-100 kg/hr of air. Therefore, the wood combustion gases, and the wood taste compounds as part of the gases, are diluted (by mass) by a factor of 50 to 145 times.

Because many people in the barbecue community believe that the wood smoke taste and smell is caused by smoke, pellet barbecue manufacturers often incorporate a 'smoke mode setting' in their controller. During this 'smoke mode' setting pellets are burned in the fire pot until only a few glowing embers remain by using a long pellet feed cycle time (80 seconds in the example given earlier). During the next on-time of the auger motor, fresh pellets cover these embers, partially cutting them off from the combustion fan air flow, thereby reducing their glow/burn temperature. This, and the fact that these embers have a low remaining thermal mass, causes the fresh pellets to heat up slowly to their ignition temperature (190-260° C.) while giving off a lot of smoke. The temperatures at or below the ignition temperature of wood are of course far to the left of the curve in FIG. 2 where significant amounts of 'wood taste and smell' compounds are released. Therefore, this practice does little to produce the desired smoke taste, but creates air pollution in form of small smoke (soot) particles.

BRIEF SUMMARY OF THE INVENTION

In a preferred embodiment, a pellet burning barbecue is configured to recirculate what would conventionally be exhaust gas. The exhaust gas recirculation pellet barbecue is configured with a recirculation fan that pulls from a gas recirculation channel. The gas recirculation channel may control the amount of oxygen pulled from outside through a movable mixer flap. The recirculation fan blows onto an angled bottom fire pot. The angled bottom fire pot allows for slower burning of the pellets to produce glow zone, which has the advantage of producing more of the desired smoke taste and reducing pellet consumption. In one embodiment, a burner fan is utilized to assist in blowing oxygen into the angled bottom fire pot to assist with increasing the temperature to quickly ignite fresh pellets.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein.

DETAILED DESCRIPTION

To mitigate the described disadvantages of current pellet barbecues, this invention proposes to change the configuration of pellet barbecues by recirculating the combustion generated gases through the fire pot multiple times to achieve a reduced oxygen atmosphere in the cooking chamber.

During this recirculation, the desired smoke taste and smell compounds will be concentrated in the combustion chamber and not diluted by outside air. Recirculated smoke particles (comprised mainly of small carbon particles) will be burned to CO and CO2 when coming on contact with pellets burning/glowing at 600-700° C. (carbon ignites at 600° C.), reducing the particle pollution generated by the barbecue.

Because very little cooler fresh air needs to be heated to the cooking temperature and then continuously exhausted, overall pellet consumption is also reduced.

Figure 1:
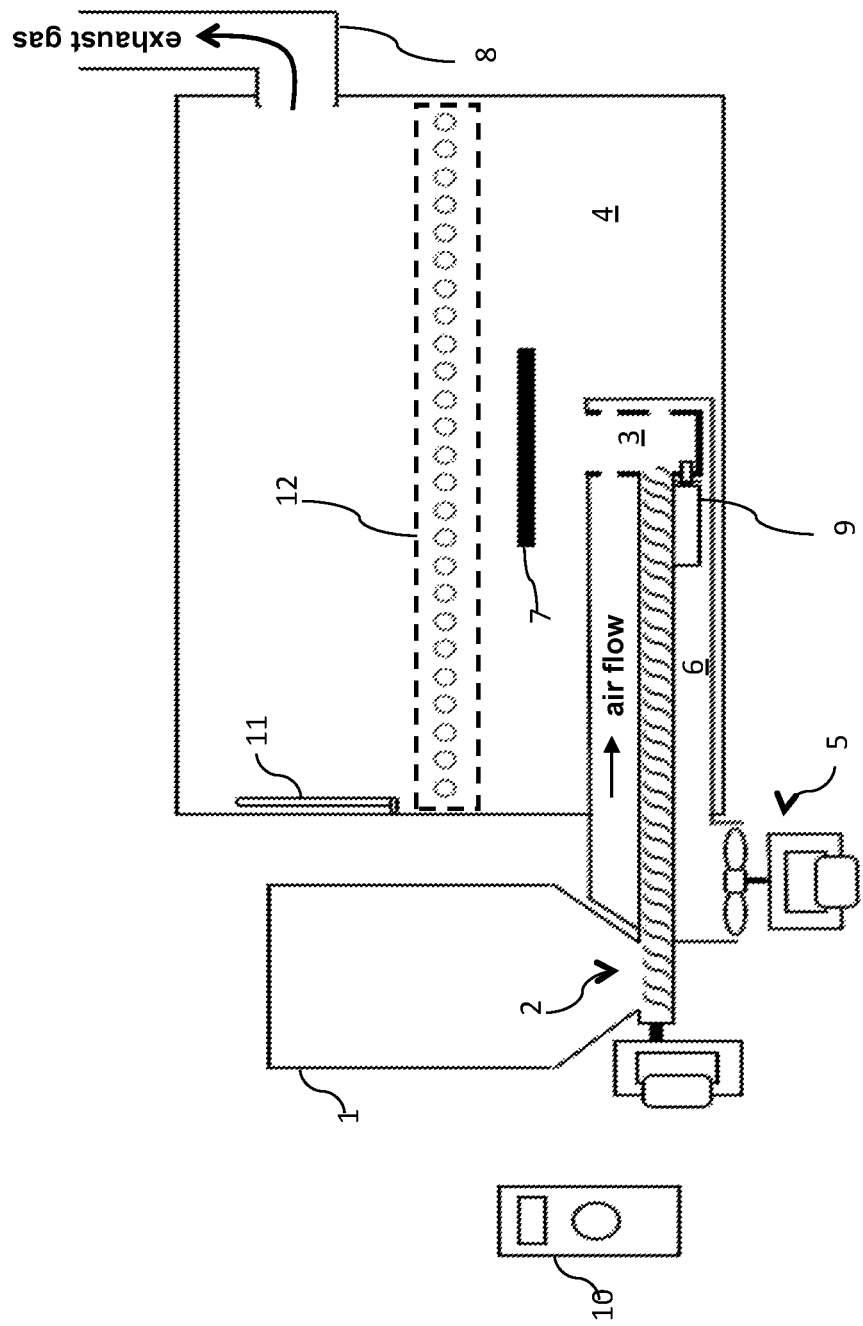
FIG. 1 is a cross sectional view of the prior art.
Figure 2:
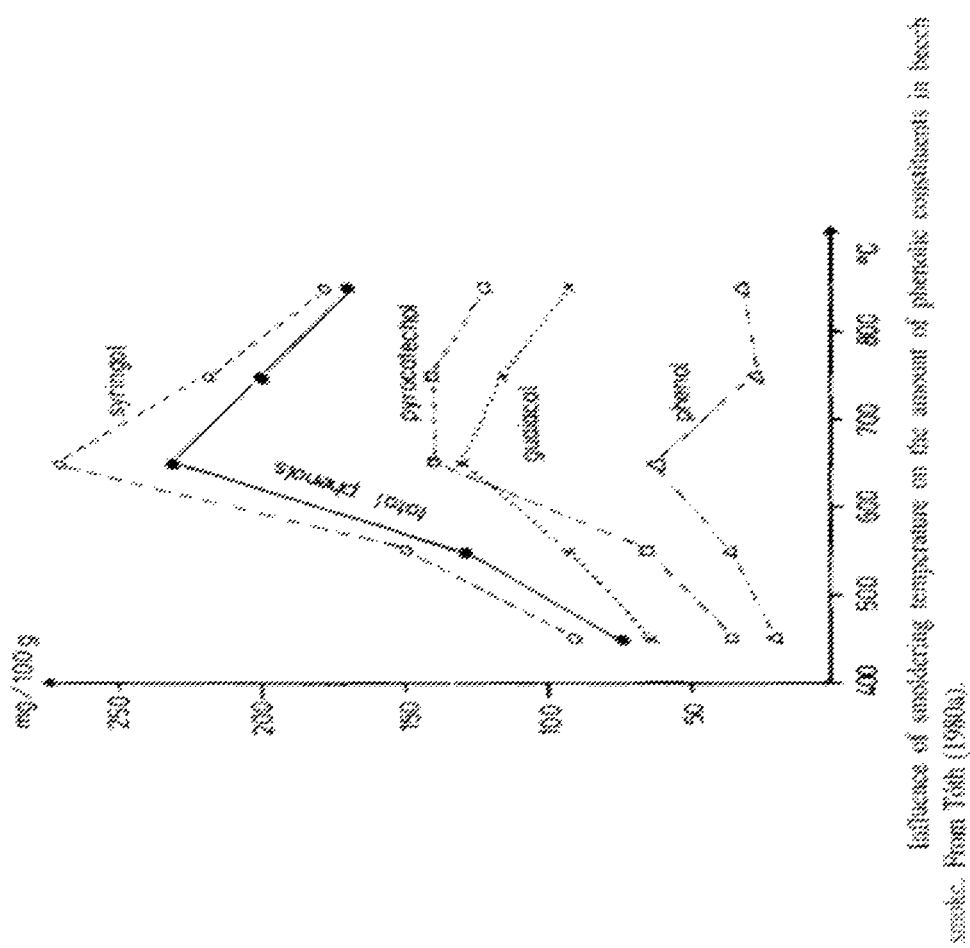
FIG. 2 is a graph of the release of phenolic compounds.
Figure 3:
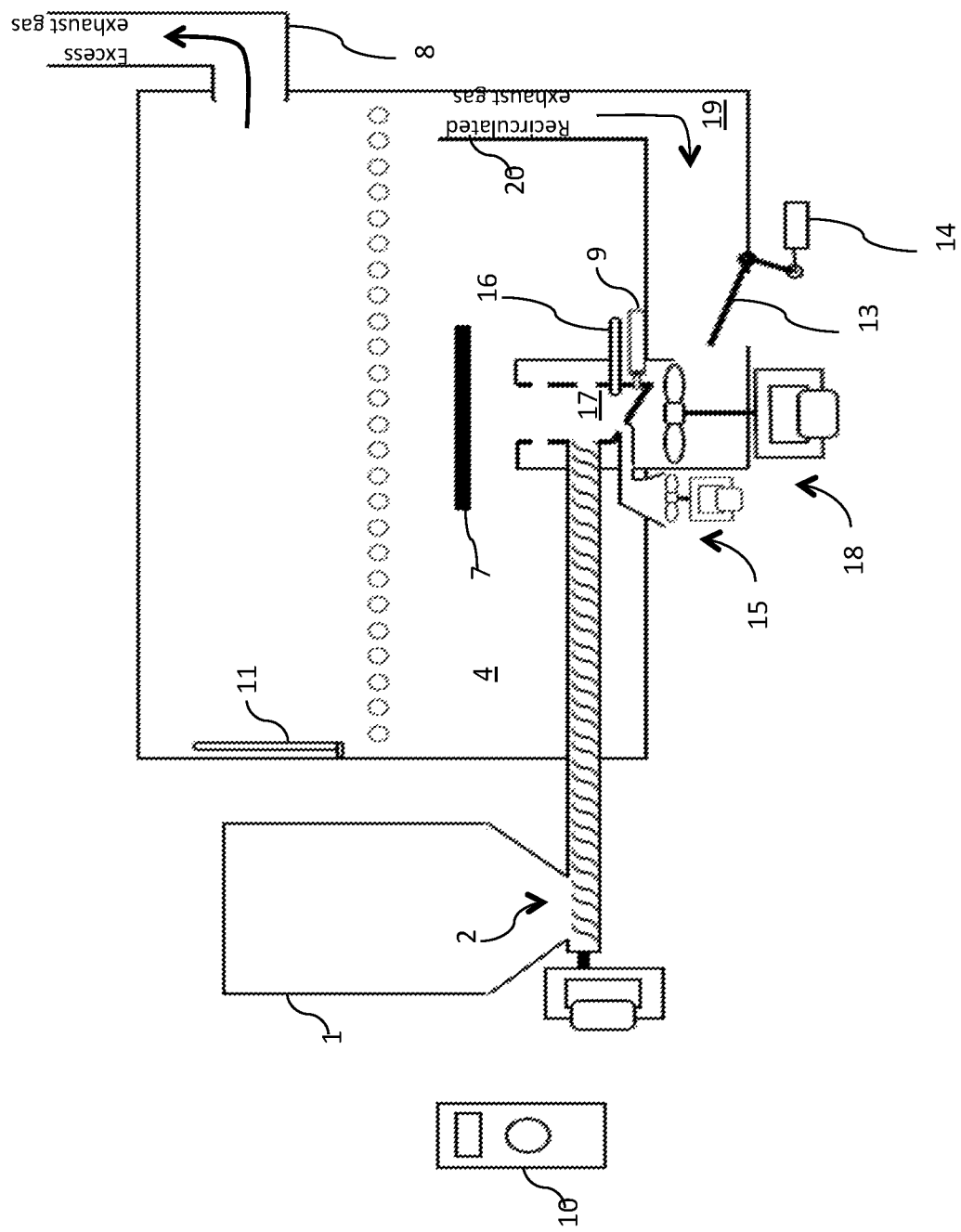
FIG. 3 is a cross sectional view of an embodiment of a pellet barbecue configured to recirculate exhaust gas.

FIG. 3 shows a cross section of a pellet barbecue with a preferred embodiment of an exhaust gas recirculation configuration.

With this configuration of a pellet barbecue (see cross section FIG. 3) wood pellets are transported from a pellet hopper 1 by a motorized auger 2 to an angled bottom fire pot 17, disposed in the cooking chamber 4. The bottom of the angled bottom fire pot 17 is angled such that pellets fed in by the auger roll away from the auger feed point to the low point of the fire pot. The gaseous content of the cooking chamber 4 is drawn by an electric gas recirculation fan 18 through a gas recirculation channel 19 to the angle bottomed fire pot 17 where the gases enter the fire pot through holes in its cylindrical walls and through small holes in the bottom of the angle bottomed fire pot near its lowest point. The fan blades of the gas recirculation fan 18 will have to be made of a material of sufficient heat resistance.

The pellets in the fire pot are ignited by an electrically heated igniter 9, or, if pellets are already burning in the fire pot, by the burning pellets in the fire pot.

The gases exiting the fire pot are deflected by one or more heat deflector plates 7 to flow evenly through the cooking chamber 4. One or more additional baffles 20 near the entrance to the gas recirculation channel prevent solid combustion products (ash) from entering the gas recirculation channel 19.

A movable mixer flap 13, disposed in the gas recirculation channel, operated by an electrically controlled actuator 14, allows to mix in outside air to control the oxygen content of the gas entering the fire pot. Because of this, the fan blades of the gas recirculation fan 18 may only have to withstand the typical barbecue temperatures of up to 150° C. A temperature rating readily attainable by many plastic materials or metals. For operation at higher cooking chamber temperatures, the movable mixer flap 13 would typically need to be fully open, exposing the fan blades only to outside air.

Optionally a second burner fan or air pump 15 blows a small amount of air at the pellets near the feed point of the auger. This fan or pump is controlled by the pellet barbecue controller 10, and operated only when fresh pellets are fed into the angled bottom fire pot 17 and possibly shortly thereafter. Its function is to increase the glow temperature of the already burning/glowing pellets from the previous feed cycle so that the fresh pellets are readily ignited with minimum smoke production. Other methods of producing a temporarily higher burn temperature for the ignition of new pellets may also be used, like temporarily opening the mixer flap 13, a secondary mixer flap and others, or temporarily increasing the flow rate of the gas recirculation fan 18.

In many cases the amount of oxygen supplied by the optional burner fan or air pump 15 is not fully consumed during the ignition process of the fresh pellets and thereby provides sufficient oxygen in the recirculated exhaust gases to maintain the burning/glowing of the already burning pellets.

This arrangement divides the angled bottom fire pot 17 into two zones:
a) The burn zone where fresh pellets are ignited and burned.
b) The glow zone where pellets glow at low temperature because the combustion air admitted to them has a low oxygen content and also acts as coolant.

The additional functions of the gas flow through the angled bottom fire pot are to produce the required gas flow for circulation through the cooking chamber and to blow the solid combustion residuals out of the fire pot. These functions do not require an oxygen containing gas and can therefore be performed by the recirculated exhaust gases.

Excess combustion gases are exhausted through the exhaust port 8.

A pellet burn temperature sensor 16 disposed near the lowest point of the fire pot allows the pellet barbecue controller 10 to control the amount of air mixed in by the mixer flap 13, or the optional burner fan/pump 15, such that the optimum glow temperature for maximum wood smoke taste and smell production of the burning/glowing pellets in the lower part of the fire pot is achieved.

Because igniters used in pellet barbecues are resistive heaters with a typically positive temperature coefficient, it is in addition possible to use the igniter 9 itself also as burn temperature sensor by measuring its resistance and correlating it with the pellet burn temperature, as the igniter is only used at startup to initially ignite pellets.

The computer in the pellet barbecue controller 10 controls the barbecue temperature, measured by one or more cooking chamber temperature sensors 11, by controlling the feed duty cycle of the pellet auger 2. In addition, it controls the amount of fresh air mixed in through the mixer flap 13, or optionally the burner fan or air pump 15 to control the pellet glow temperature.

During startup, and if a high cooking chamber temperature is required for grilling or baking, the controller 10 will open the mixer flap 13 partially or fully to reach the desired temperature quickly. In this mode of operation this type of pellet barbecue operates like a conventional pellet barbecue.

When, or before the desired temperature of the gas temperature in the cooking chamber for barbecuing is reached, the pellet barbecue controller 10 will fully close the mixer flap 13 through the actuator 14. This reduces the oxygen content of the cooking chamber. The pellet barbecue controller 10 will then commence to control the pellet glow temperature, measured by the pellet burn temperature sensor 16 to the desired level and control the cooking chamber temperature by the pellet feed rate. A typical mid-sized pellet barbecue with a cooking chamber volume of 0.185 m3 will theoretically deplete the oxygen on the cooking chamber completely by burning just 0.034 kg of pellets. At a pellet feed rate of 50% of the maximum auger feed rate of such a typical mid-sized barbecue of 1.1 kg/hr, as required to heat up the cooking chamber initially, or compensate for the heat loss after the user opened the cooking chamber to check the food, the oxygen in the initially air filled cooking chamber would then be depleted in 3.7 minutes.

In another embodiment of this invention, instead of a pellet burn temperature sensor 16, an oxygen sensor, for example an automotive wideband oxygen sensor, disposed in the gas flow after the gas recirculation fan, may be used. The measured oxygen content of the gas entering the fire pot can then be correlated to the burn temperature of the pellets in the glow zone of the fire pot and also correlated to the flow rate of the gas recirculation fan (if of variable speed). The advantage of an oxygen sensor is its fast reaction speed compared to the burn temperature sensor.

When the operator opens the barbecue to see the cooking chamber, for example check the food, the hot and oxygen depleted gases in the cooking chamber will be quickly replaced by high oxygen content outside air. This will cause a fast rise in the temperature measured by the burn temperature sensor, or a fast rise in oxygen content when measured by an oxygen sensor. In such a case the pellet barbecue controller will operate as above at startup until the cooking chamber temperature stabilizes back to the desired temperature after the cooking chamber is closed again.

Figure 4A:
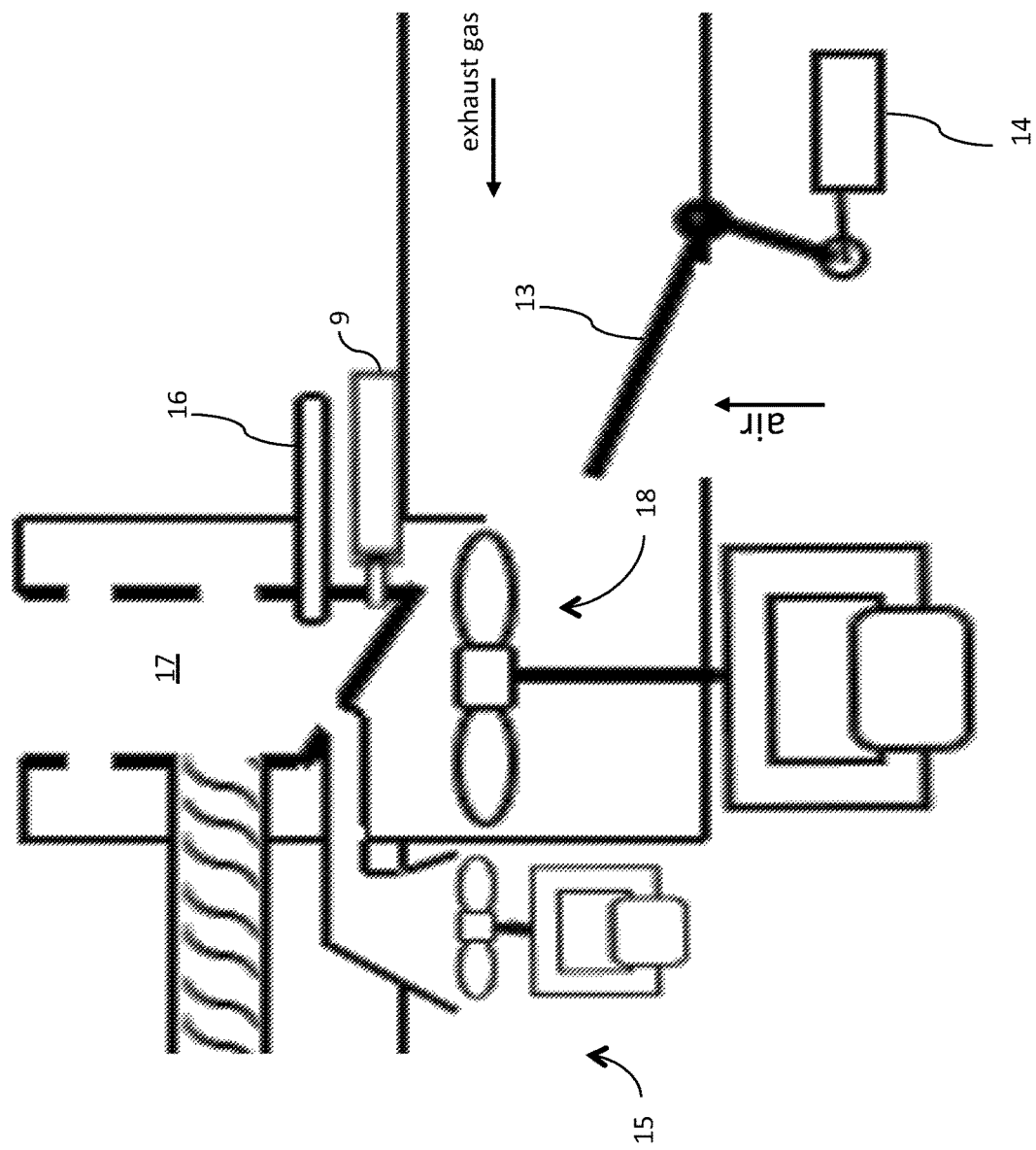
FIG. 4a is a cross sectional view of the recirculation fan operation with the movable mixer flap partially open.

An enlarged version of the pellet burn area, fans and mixer flap 13 arrangement is shown in FIG. 4a.

Figure 4B:
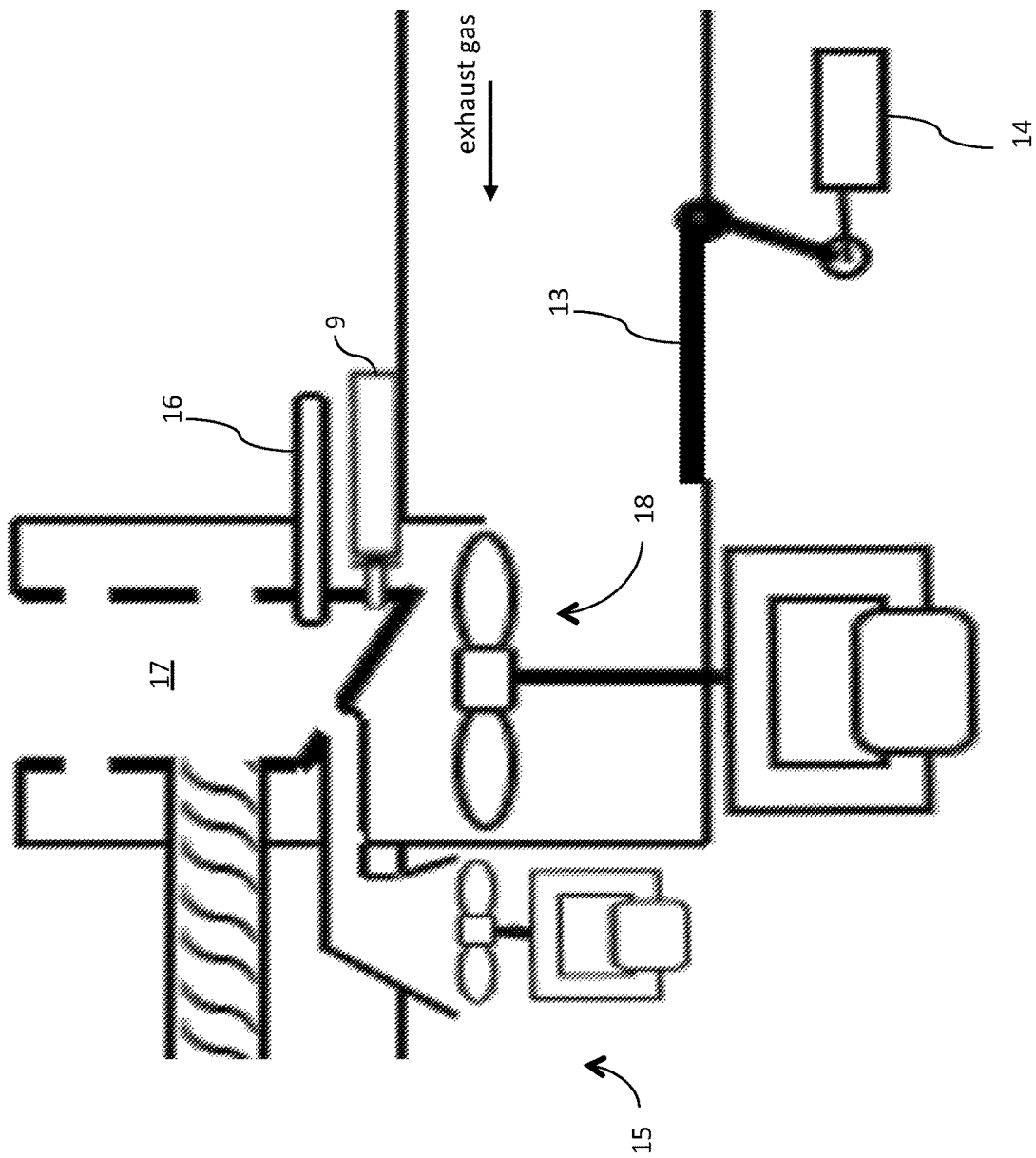
FIG. 4b is a cross sectional view of the recirculation fan operation with the movable mixer flap fully closed.

FIG. 4b shows the same with the mixer flap 13 closed so no outside air can enter.

Figure 4C:
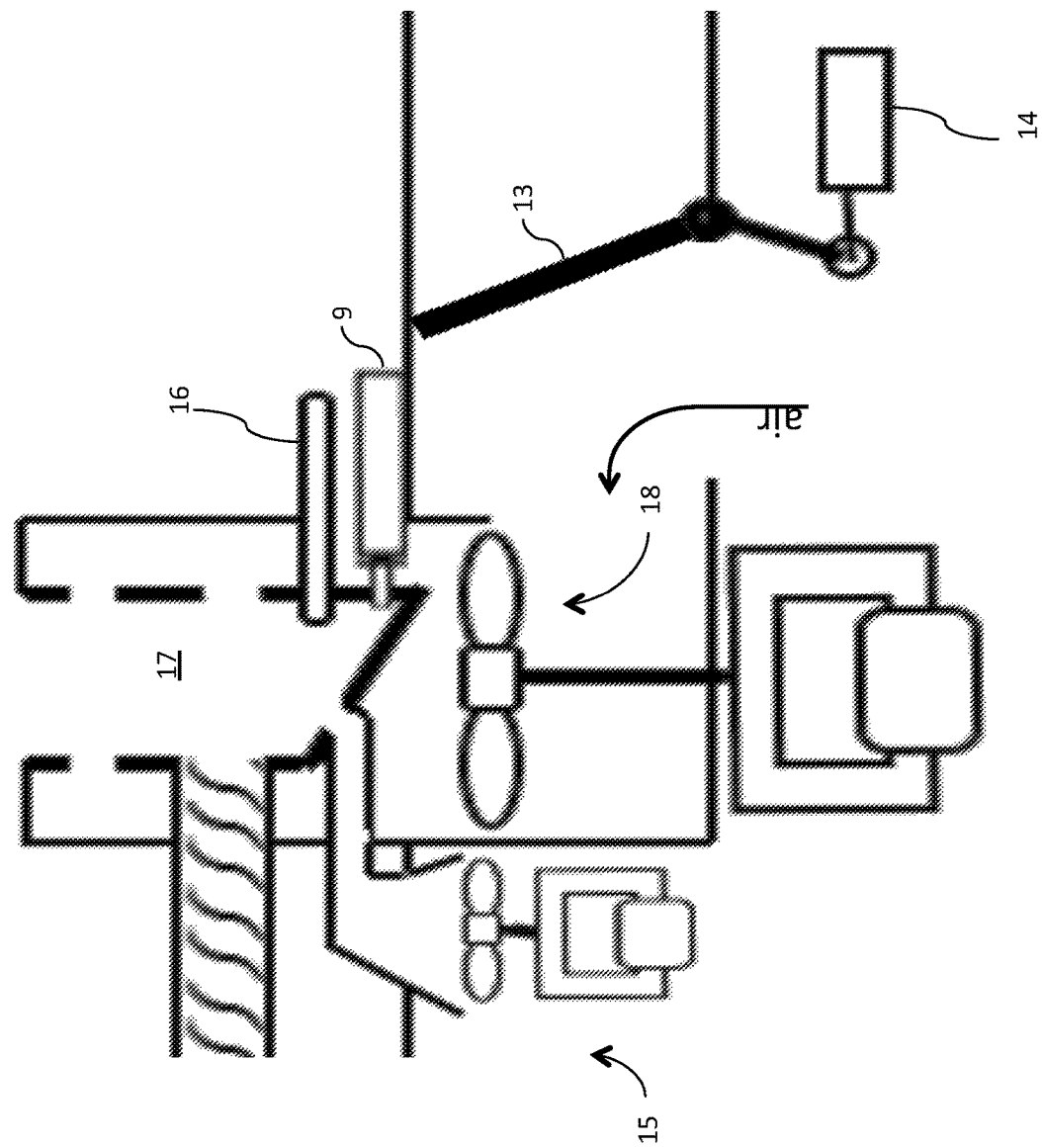
FIG. 4c is a cross sectional view of the recirculation fan operation with the movable mixer flap fully opened.

FIG. 4c shows the same with the mixer flap 13 fully open, causing no or very reduced exhaust gas recirculation.

Although the present invention has been described in detail with respect to certain embodiments and examples, variations and modifications exist which are within the scope of the present invention as defined in the following claims.

What is claimed is:

1. An exhaust gas recirculating pellet barbecue comprising:
   a pellet hopper;
   an angled bottom fire pot, comprising of a higher bottom side and a lower bottom side;
   a motorized auger for moving a pellet from said pellet hopper to said angled bottom fire pot, wherein pellets are fed to said higher bottom side;
   a cooking chamber above said angled bottom fire pot;
   an electric gas recirculation fan capable of blowing to said angled bottom fire pot;
   a gas recirculation channel with an intake gas opening within said cooking chamber, leading to said electric gas recirculation fan; and
   a pellet barbecue controller for controlling said electric gas recirculation fan and said motorized auger.

2. The exhaust gas recirculating pellet barbecue of claim 1 further comprising of a mixer flap on said gas recirculation channel, wherein said mixer flap is controlled by said pellet barbecue controller and opening said mixer flap allows for air outside of said cooking chamber to enter into said gas recirculation channel.

3. The exhaust gas recirculating pellet barbecue of claim 2 further comprising of a pellet burn temperature sensor for sensing the temperature near the lowest point of said angled bottom fire pot and an electrically heated igniter.

4. The exhaust gas recirculating pellet barbecue of claim 3 wherein said pellet barbecue controller controls speed of said electric gas recirculation fan and controls opening of said mixer flap to maintain an optimum glow temperature of the pellet in said angled bottom fire pot.

5. The exhaust gas recirculating pellet barbecue of claim 4 wherein said pellet barbecue controller opens mixer flap and activates electric gas recirculation fan when a new pellet is added to said angled bottom fire pot.

6. The exhaust gas recirculation pellet barbecue of claim 1 further comprising of a burner fan capable of blowing air from outside of said cooking chamber to said angled bottom fire pot.

7. The exhaust gas recirculation pellet barbecue of claim 6 wherein said pellet barbecue controller activates said burner fan when a new pellet is added to said angled bottom fire pot.

8. The exhaust gas recirculating pellet barbecue of claim 6 further comprising of a pellet burn temperature sensor for sensing the temperature near the lowest point of said angled bottom fire pot and an electrically heated igniter.

9. The exhaust gas recirculating pellet barbecue of claim 8 wherein said pellet barbecue controller controls speed of said burner fan to maintain an optimum glow temperature of the pellet in said angled bottom fire pot.

10. The exhaust gas recirculating pellet barbecue of claim 2 further comprising of an oxygen sensor for measuring oxygen content of the gas entering said angled bottom fire pot and an electrically heated igniter.

11. The exhaust gas recirculating pellet barbecue of claim 10 wherein said pellet barbecue controller controls speed of said electric gas recirculation fan and controls opening of said mixer flap to maintain an optimum glow temperature of the pellet in said angled bottom fire pot.

12. The exhaust gas recirculating pellet barbecue of claim 11 wherein said pellet barbecue controller opens mixer flap and activates electric gas recirculation fan when a new pellet is added to said angled bottom fire pot.

13. The exhaust gas recirculating pellet barbecue of claim 6 further comprising of an oxygen sensor for measuring oxygen content of the gas entering said angled bottom fire pot and an electrically heated igniter.

14. The exhaust gas recirculating pellet barbecue of claim 13 wherein said pellet barbecue controller controls speed of said burner fan to maintain an optimum glow temperature of the pellet in said angled bottom fire pot.

\* \* \* \* \*